US012752831B1

(12) United States Patent
Hruska et al.

(10) Patent No.: US 12,752,831 B1
(45) Date of Patent: Oct. 6, 2026

(54) STEERING COLUMN

(71) Applicant: DEERE & COMPANY, Moline, IL (US)

(72) Inventors: Derek D. Hruska, Cresco, IA (US); Sushant Ramnath Wagh, Pune (IN); Christopher J. Mefford, Vinton, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/312,440

(22) Filed: Aug. 28, 2025

(51) Int. Cl.
*B62D 1/183* (2006.01)
*B62D 1/184* (2006.01)

(52) U.S. Cl.
CPC ............. *B62D 1/183* (2013.01); *B62D 1/184* (2013.01)

(58) Field of Classification Search
CPC ................................ B62D 1/184; B62D 1/183
See application file for complete search history.

(56) References Cited

U.S. PATENT DOCUMENTS

| | | | | |
|---|---|---|---|---|
| 5,088,342 | A | 2/1992 | Bening et al. | |
| 6,176,150 | B1 | 1/2001 | Foegeling | |
| 12,534,120 | B2 * | 1/2026 | Barel | B62D 1/183 |
| 2007/0273136 | A1 * | 11/2007 | Cartwright | B62D 1/183 280/775 |
| 2010/0186536 | A1 * | 7/2010 | Cartwright | B62D 1/183 74/495 |
| 2016/0297466 | A1 * | 10/2016 | Sedlmeier | B62D 1/187 |
| 2025/0083733 | A1 * | 3/2025 | Barel | B62D 1/197 |
| 2026/0008491 | A1 * | 1/2026 | Pard | B62D 1/183 |

FOREIGN PATENT DOCUMENTS

| | | | | |
|---|---|---|---|---|
| BR | 102024022138 A2 * | 6/2025 | |
| CN | 114715258 A * | 7/2022 | B62D 1/181 |
| DE | 2727270 A1 * | 6/1978 | |
| DE | 102005022408 A1 * | 11/2006 | B62D 1/195 |
| DE | 102007021907 A1 * | 12/2007 | B62D 1/184 |
| DE | 102009001324 A1 * | 9/2010 | B62D 1/181 |
| DE | 112013001099 T5 * | 11/2014 | B62D 1/183 |
| DE | 102022205078 B3 * | 7/2023 | B62D 1/08 |
| EP | 1721806 A2 * | 11/2006 | B62D 1/197 |
| EP | 4139171 A1 | 3/2023 | |

(Continued)

*Primary Examiner* — Nicole T Verley
(74) *Attorney, Agent, or Firm* — Hanley, Flight & Zimmerman, LLC

(57) ABSTRACT

A steering column for a vehicle comprises an upper component, an intermediate component, an adjustable linkage, a first adjustment lock, and a second adjustment lock. The upper component is pivotable about a first axis and includes a first positioning portion. The upper component supports a steering shaft for steering the vehicle. The intermediate component is pivotable relative to the upper component about the first axis and includes a second positioning portion. The first adjustment lock secures a relative position between the intermediate component and the upper component. The second adjustment lock has a locking mechanism engaging the first positioning portion when the upper component and the intermediate component are disposed in a first memory tilt position. The locking mechanism engages the second positioning portion when the upper component and the intermediate component are disposed in a second memory tilt position.

19 Claims, 11 Drawing Sheets

(56) References Cited

FOREIGN PATENT DOCUMENTS

| | | | | | |
|---|---|---|---|---|---|
| SE | 0950229 | A1 * | 10/2010 | ............. | B62D 1/183 |
| WO | WO-2006108631 | A1 * | 10/2006 | ............. | B62D 1/187 |
| WO | WO-2016206752 | A1 * | 12/2016 | ............. | B62D 1/183 |
| WO | WO-2017175118 | A1 * | 10/2017 | ............. | B62D 1/183 |
| WO | WO-2021131556 | A1 * | 7/2021 | ............ | E02F 9/2004 |

* cited by examiner

STEERING COLUMN

TECHNICAL FIELD

The present disclosure relates generally to a steering column.

BACKGROUND

A steering column is a component in a vehicle's steering system. It connects a steering wheel to a steering mechanism (e.g., steering gearbox), allowing an operator to control the direction of the vehicle.

SUMMARY

According to an aspect of the present disclosure, a steering column for a vehicle comprises an upper component, an intermediate component, an adjustable linkage, a first adjustment lock, and a second adjustment lock. The upper component is pivotable about a first axis and includes a first positioning portion. The upper component is configured for supporting a steering shaft configured for steering the vehicle. The intermediate component is pivotable relative to the upper component about the first axis and includes a second positioning portion. The adjustable linkage interconnects the upper component and the intermediate component. The first adjustment lock is configured to secure a relative position between the intermediate component and the upper component to maintain a tilt angle about the first axis defined between the first positioning portion and the second positioning portion. The second adjustment lock has a locking mechanism configured for engaging the first positioning portion of the upper component when the upper component and the intermediate component are disposed in a first memory tilt position relative to and about the first axis. The locking mechanism is configured for engaging the second positioning portion of the intermediate component when the upper component and the intermediate component are disposed in a second memory tilt position relative to and about the first axis. The relative position between the upper component and the intermediate component is maintained by the first adjustment lock during movement between the first memory tilt position and the second memory tilt position.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
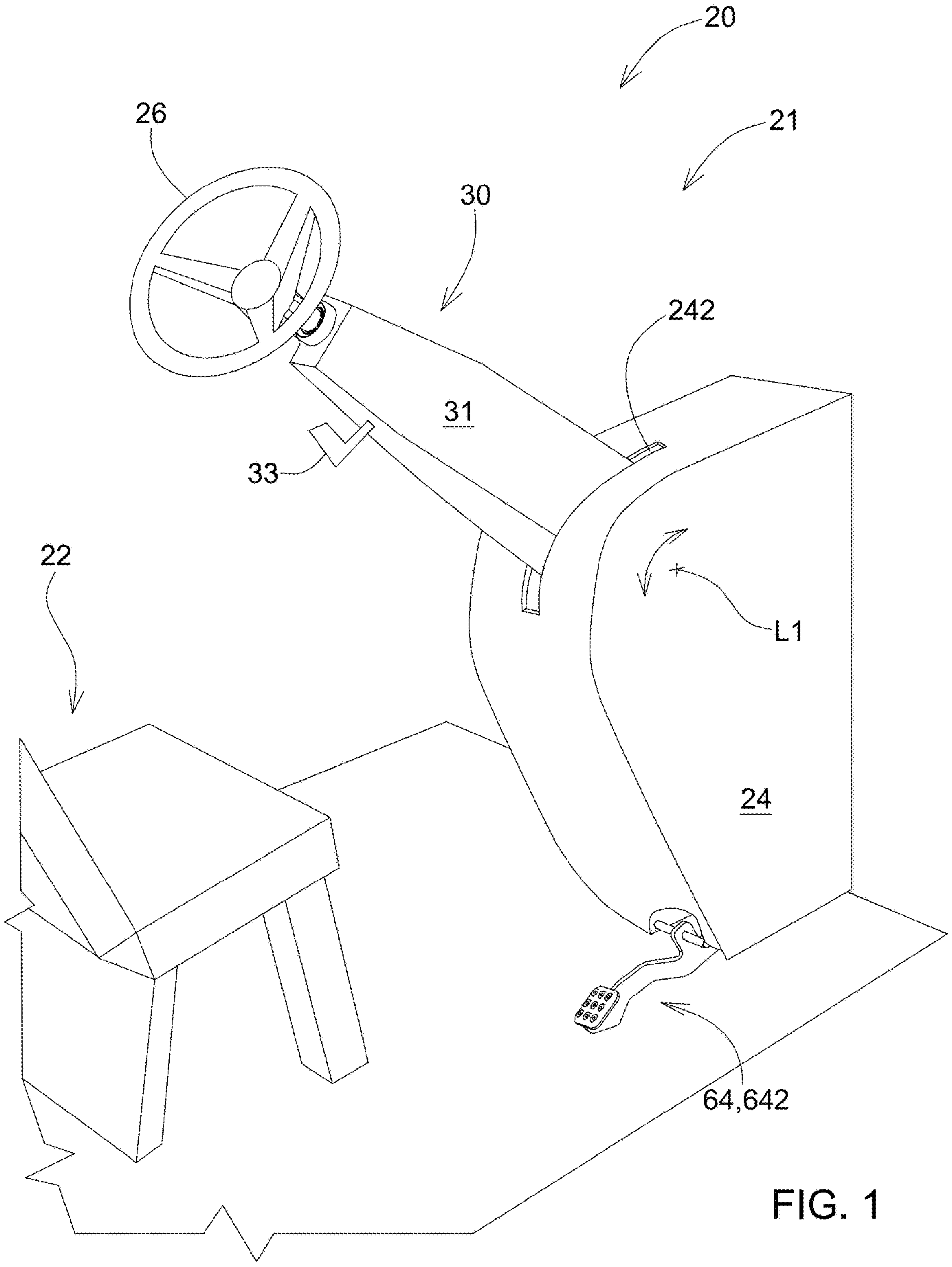
FIG. 1 is a perspective view of an operator station of a vehicle.

Referring to FIG. 1, a vehicle 20 may include a cab 21 having an operator seat 22 and a base 24. The base 24 is positioned in front of the operator seat 22. A steering column 30 extends from the base 24 through an opening 242, which is configured to allow the steering column 30 to rotate around a first axis L1. The steering column 30 includes a column housing 31 and a steering shaft 32 partially covered by the column housing 31. A steering wheel 26 is an operator's input device and is mounted at the top of the steering shaft 32. A lower end of the steering shaft 32 may be coupled to a universal joint (not shown) which connects another shaft, which is coupled to a steering mechanism such as a mechanical gearbox, a hydraulic control valve to change the direction of the vehicle 20. The steering shaft 32 may transmit torque from the steering wheel 26 to the steering mechanism, which may convert the rotary motion of the steering shaft 32 into lateral movement of the wheels.

Figure 2A:
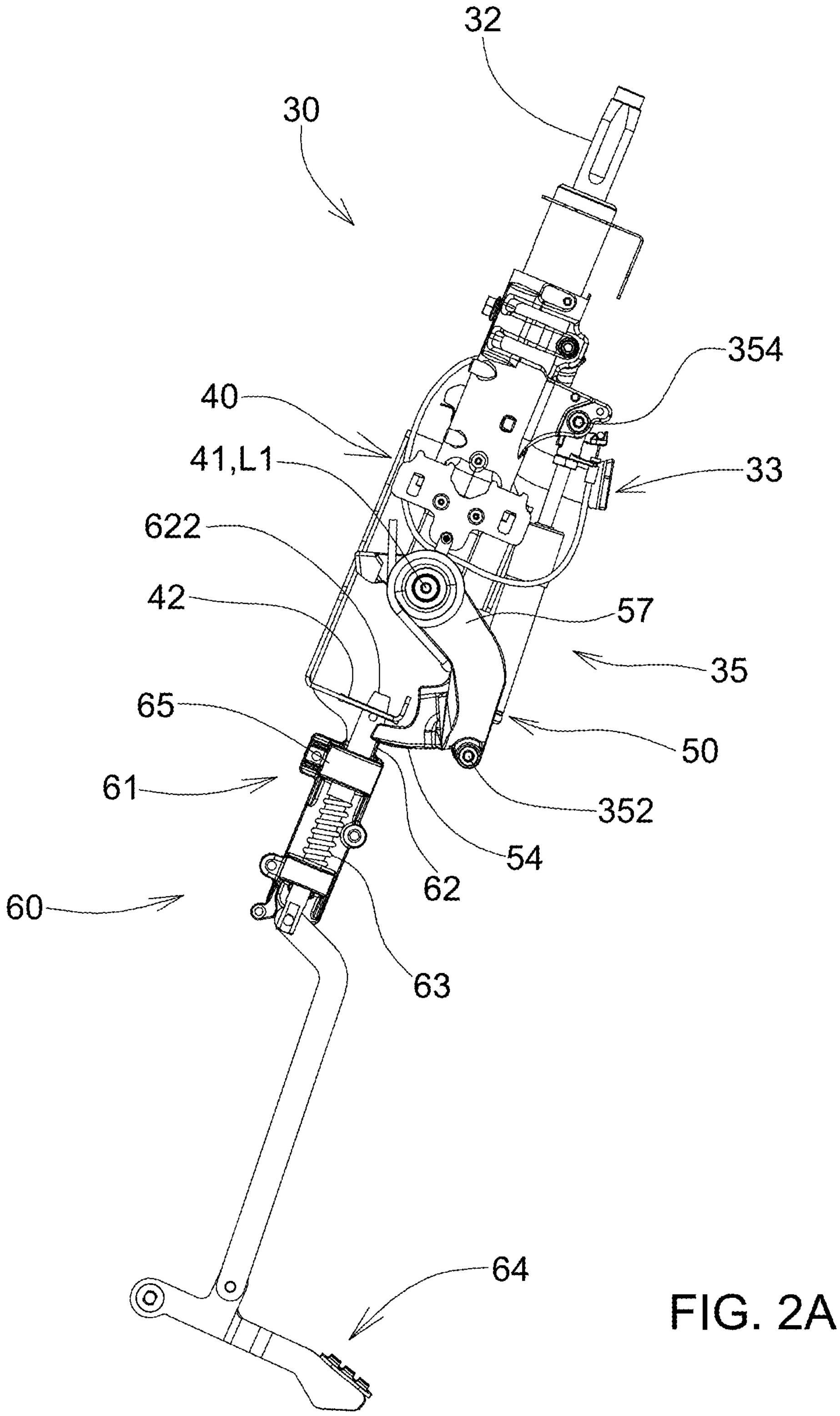
FIG. 2A is a left side view of a steering column disposed in a first memory tilt position (e.g., a stow away position) in a first setting.
Figure 2B:
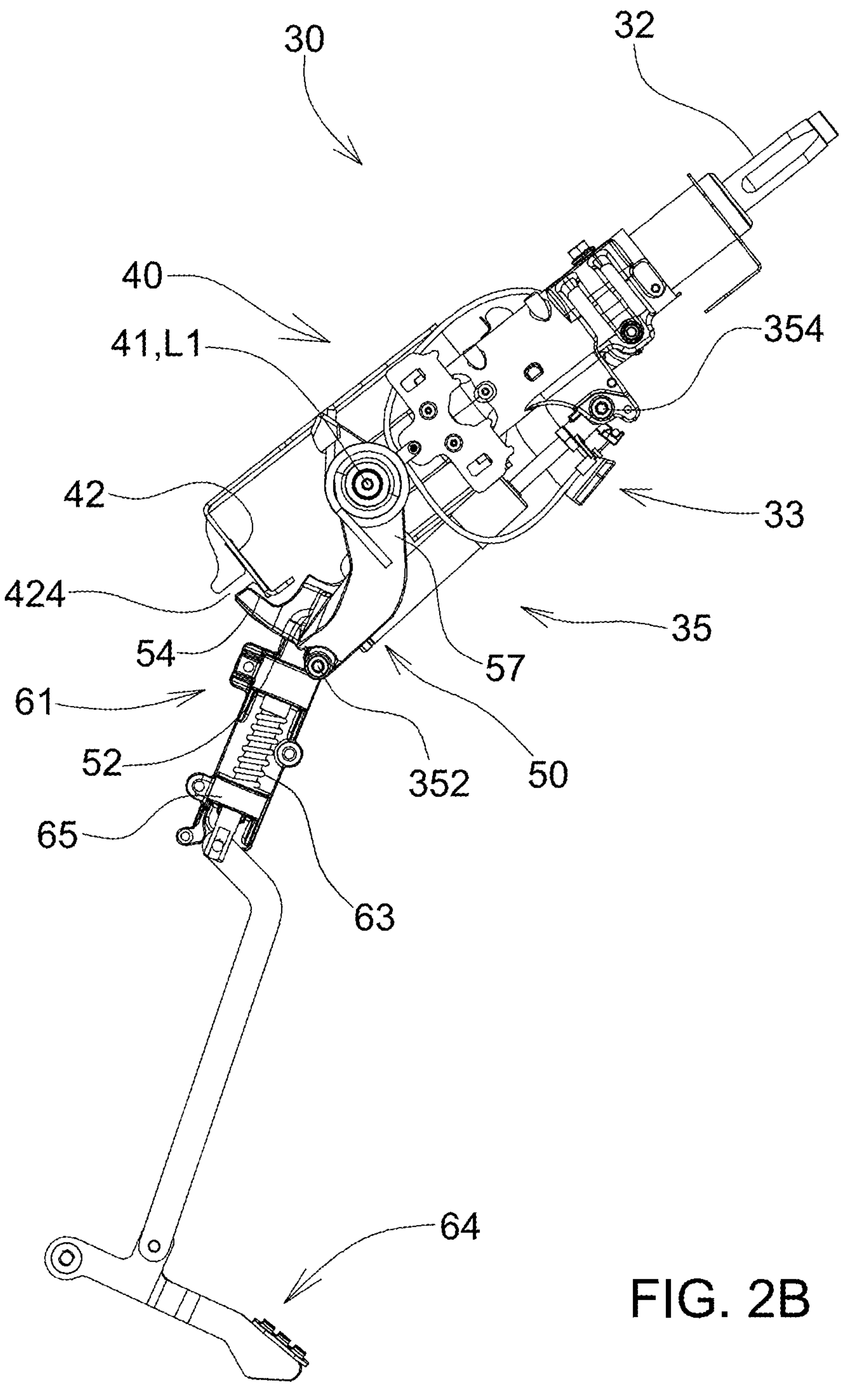
FIG. 2B is a left side view of the steering column disposed in a second memory tilt position (e.g., an operational position) in the first setting of FIG. 2A.
Figure 2C:
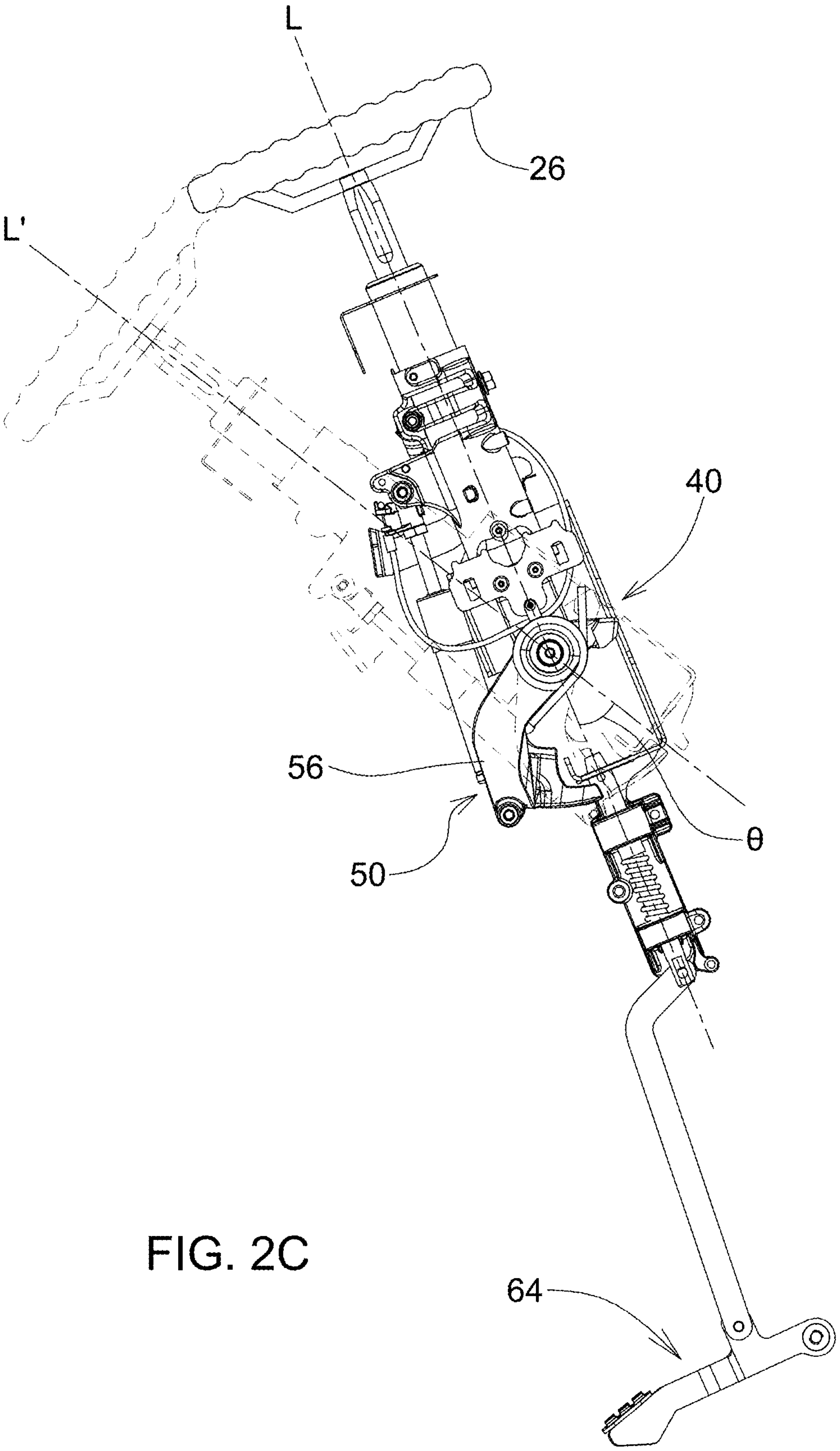
FIG. 2C is a right side view of the steering column demonstrating a tilt angle between the stow away and operational positions in the first setting defined by an upper component and an intermediate component.
Figure 3A:
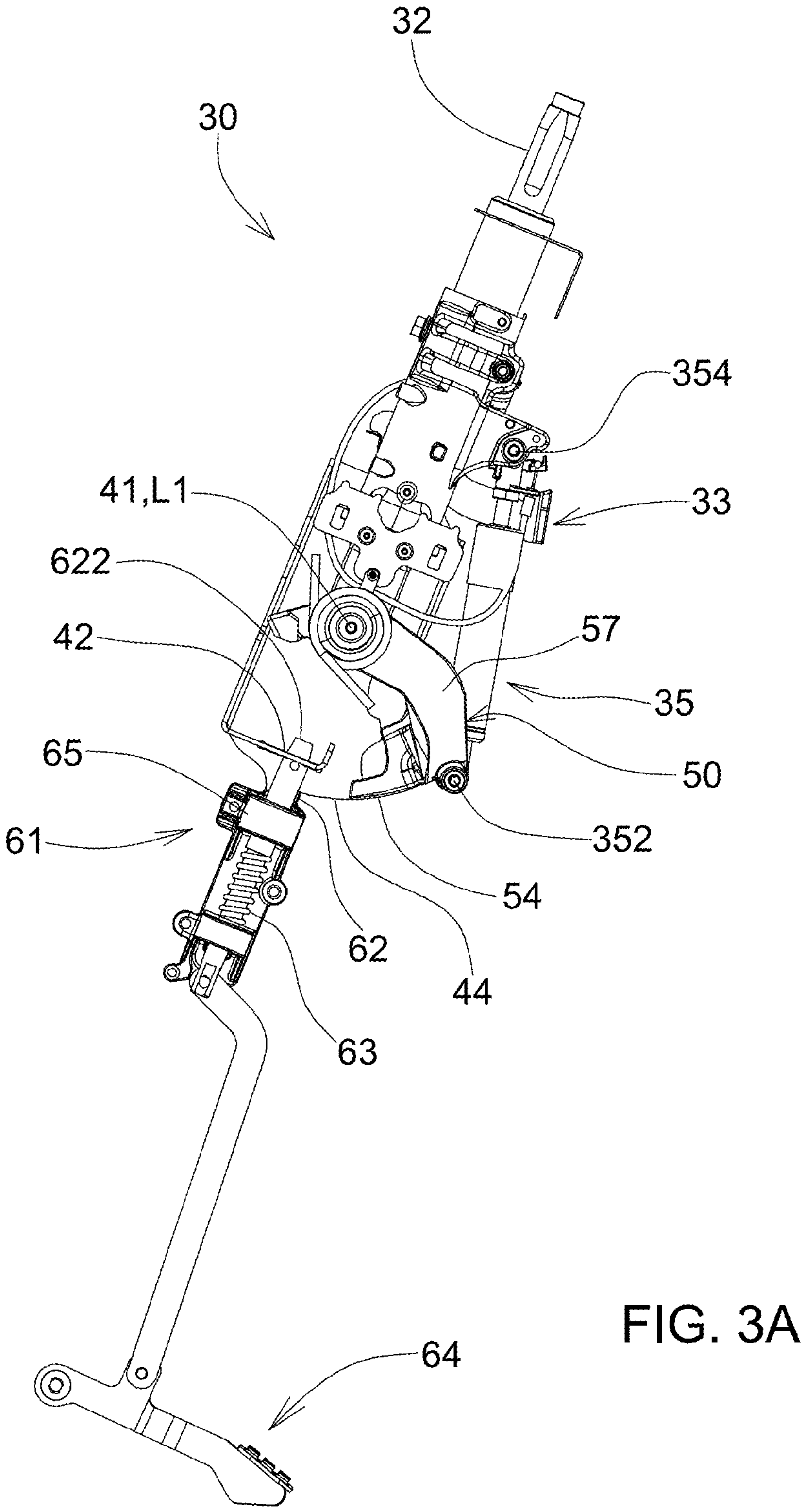
FIG. 3A is a left side view of the steering column disposed in a first memory tilt position (e.g., a stow away position) in a second setting.
Figure 3B:
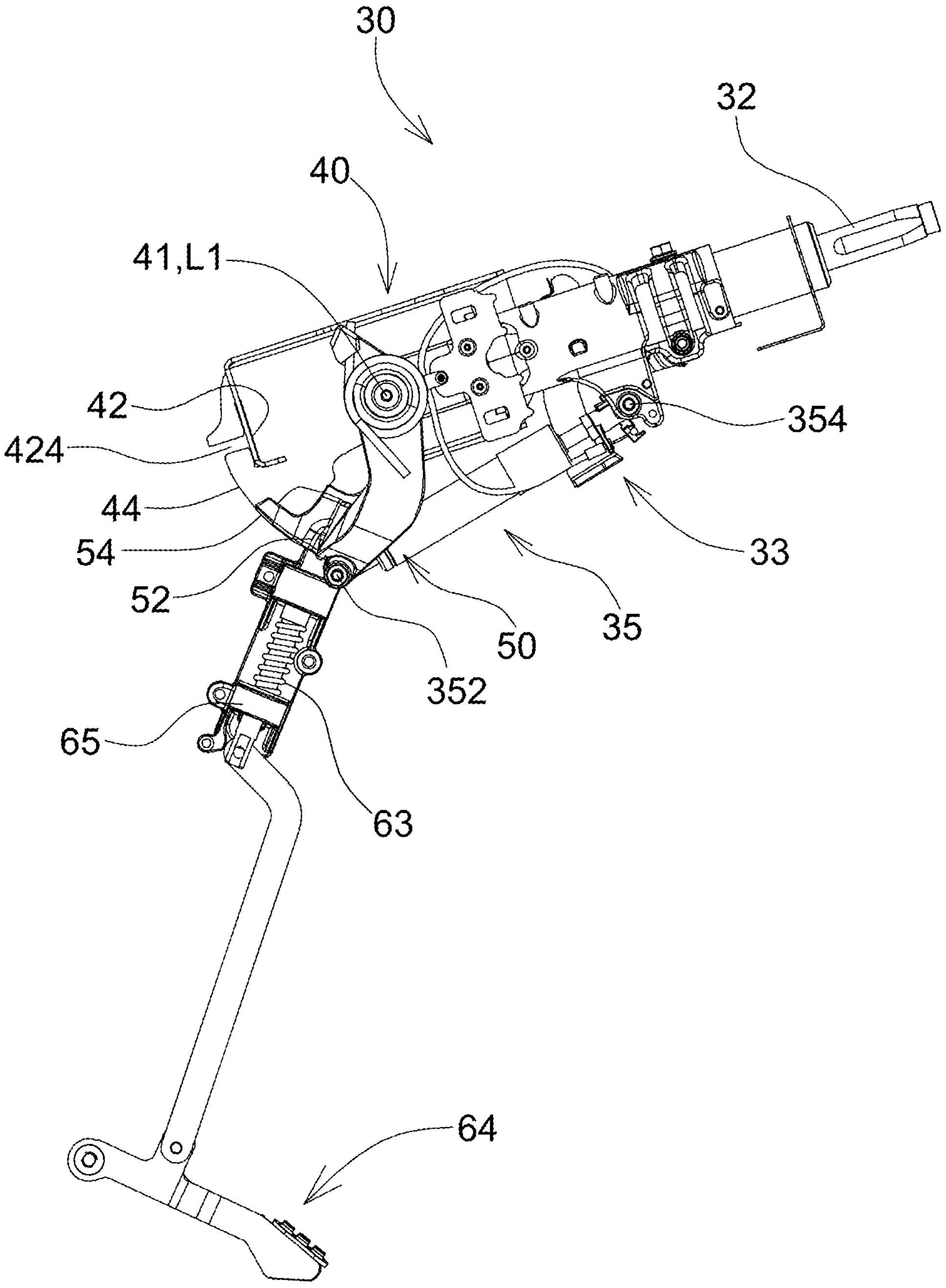
FIG. 3B is a left side view of the steering column disposed in a second memory tilt position (e.g., an operational position) in the second setting of FIG. 3A.
Figure 3C:
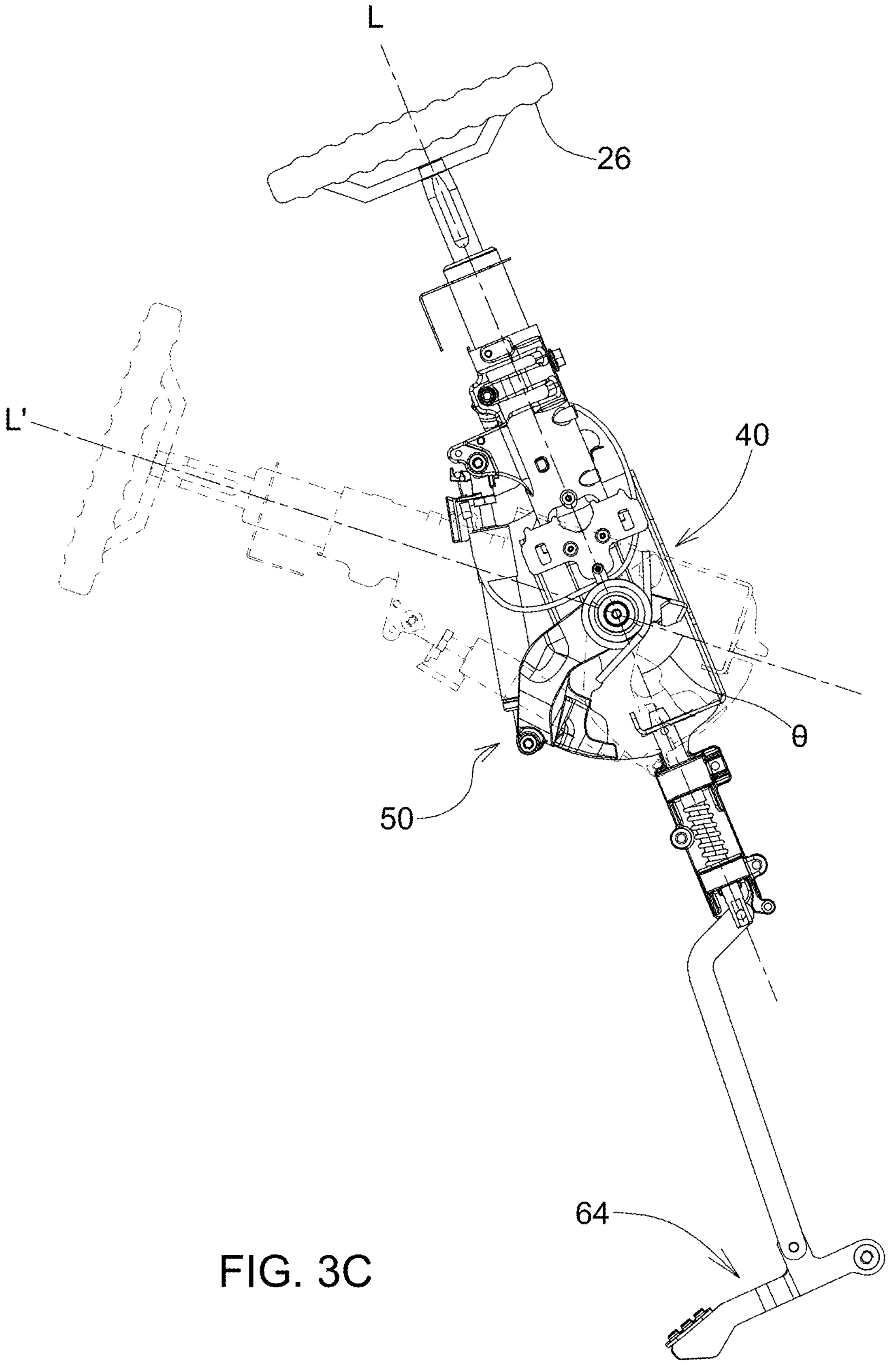
FIG. 3C is a right side view of the steering column demonstrating a greater tilt angle between the stow away and operational positions in the second setting defined by the upper component and the intermediate component.

Different operators may have different desired positions of steering column 30 when the operators sit on the operator seat 22 and operate the steering wheel 26. The operating positions of the steering column 30, for example embodiments, are illustrated in FIGS. 2B, 3B. When the operators want to leave the operator seat 22, the space between the operator seat 22 and the steering column 30 needs to be sufficient to allow the operator to leave (stow away) from the operator seat 22. The steering column 30 in this disclosure can be rotated upward to park positions of respective settings to allow the operators to leave the seat or stand up more comfortably. The park positions of the steering column 30, for example embodiments, are illustrated in FIGS. 2A, 3A. FIGS. 2A-2C illustrate a first setting and FIGS. 3A-3C illustrate a second setting. Regarding the park positions, the first setting (FIG. 2A) and the second setting (FIG. 3A) may have the same position or similar position relative to the operator seat 22. Regarding the operating positions, the first setting (FIG. 2B) and the second setting (FIG. 3B) may have different positions relative to the operator seat 22, depends on respective operators' preferences. FIG. 2C and FIG. 3C respectively illustrate a tilt angle θ in the first setting and another tilt angle θ in the second setting. In FIGS. 2C, 3C, when the steering column 30 is disposed in the parking position, an axis L extending along the direction of the steering shaft 32 is shown. When the steering column 30 is disposed in the operating position, an axis L' extending along the direction of the steering shaft 32 is shown. The tilt angle θ is defined between the axis L and axis L'. The tilt angle θ shown in the second setting is greater than the tilt angle θ shown in the first setting. The detailed structure of the steering column 30 is described below.

Referring to FIGS. 2A-3C, the column housing 31 is omitted for clarity. The steering column 30 may include an upper component 40, an intermediate component 50, an adjustable linkage 35, a first adjustment lock 33, and a second adjustment lock 60. The upper component 40 is pivotable about the first axis L1 with a first hinge 41. The upper component 40 may include a first positioning portion 42. The upper component 40 is configured for supporting the steering shaft 32. The upper component 40 in this implementation may include one or more metal brackets. However, in another implementation, the upper component 40 may be formed in different configurations or materials.

The intermediate component 50 is pivotable relative to the upper component about the first axis L1 and may include a second positioning portion 52. The first hinge 41 interconnects the upper component 40 and the intermediate component 50. The adjustable linkage 35 may include one of a strut, a turn buckle, and an electric actuator. The adjustable linkage 35 interconnects the upper component 40 and the intermediate component 50. A second hinge 352 interconnects the adjustable linkage 35 and the intermediate component 50 and a third hinge 354 interconnects the adjustable linkage 35 and the upper component 40. The immediate component 50 includes a first arm 56 and a second arm 57, upper ends of which are pivotably coupled to the first hinge 41 with the upper component 40 disposed therebetween. The first arm 56 and the second arm 57 extend downward and are coupled to the adjustable linkage 35 via the second hinge 352.

Figure 6A:
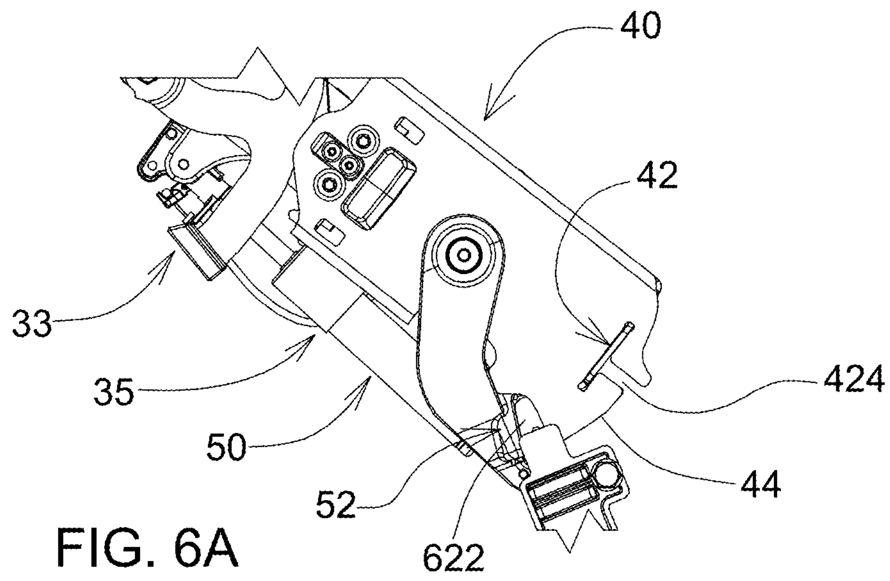
FIGS. 6A-6C illustrate different tilt angles defined between the first positioning portion and a second positioning portion.
Figure 6B:
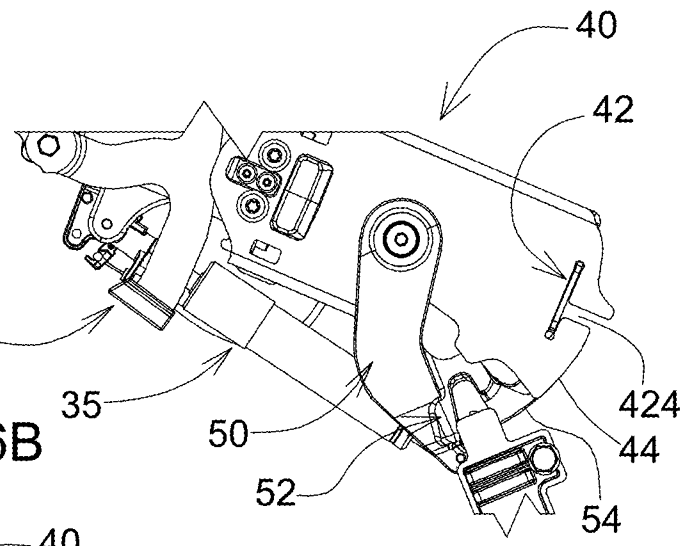
Figure 6C:
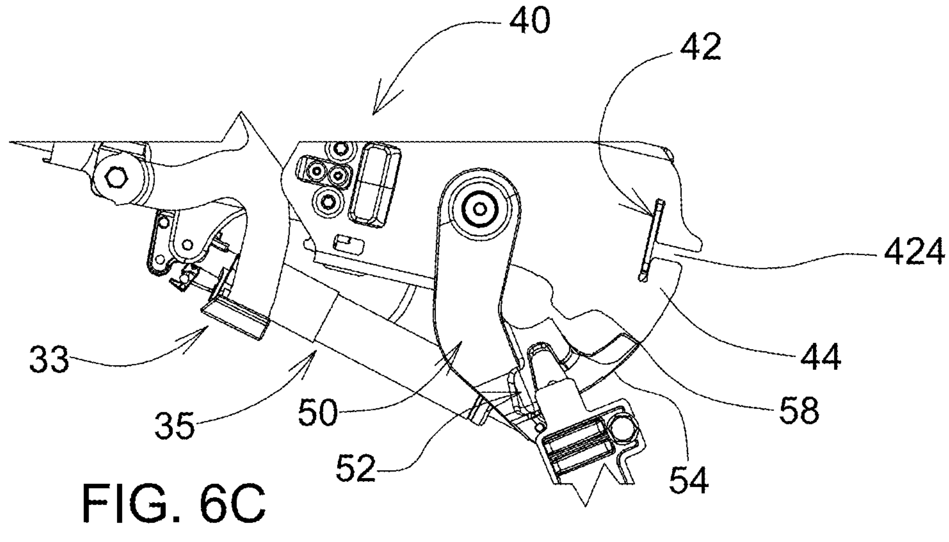

The first adjustment lock 33 is configured to secure a relative position between the intermediate component 50 and the upper component 40 to maintain the tilt angle θ about the first axis L1 defined between the first positioning portion and the second positioning portion. The first adjustment lock 33, for example, may include a lever, which can pull a cable coupled to the adjustable linkage 35, which is a strut in this example. With the pulling of the cable, the strut is allowed to extend or retract to change the tilt angle θ. Once the preferred tilt angle θ or the relative position between the intermediate component 50 and the upper component 40 is determined, the operator may return the lever to its original position, and the relative position between the intermediate component 50 and the upper component 40 is secured by the first adjustment lock 33. FIGS. 6A-6C illustrate three relative positions between the intermediate component 50 and the upper component 40, which will be discussed later.

Figure 5:
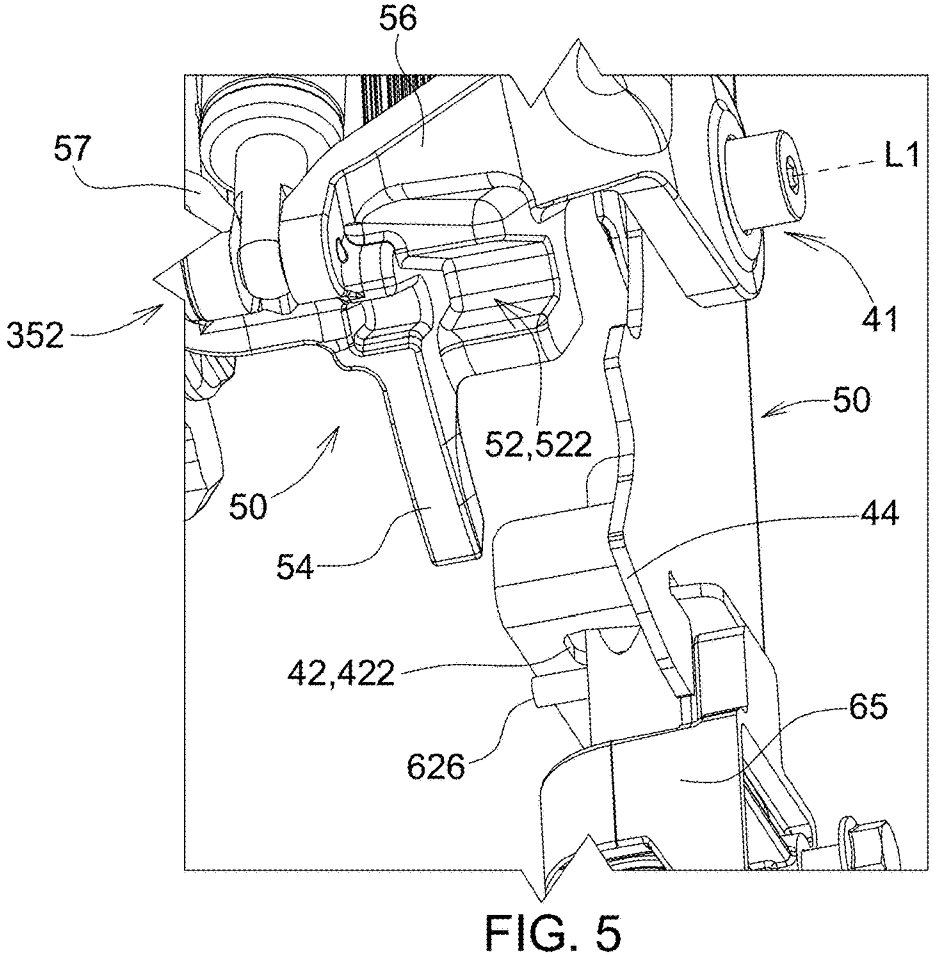
FIG. 5 is another enlarged perspective view of the second adjustment lock, where the latch pin is released to engage a first position portion of the upper component.

The second adjustment lock 60 has a locking mechanism 61 configured for engaging the first positioning portion 42 of the upper component 40 when the upper component 40 and the intermediate component 50 are disposed in a first memory tilt position relative to and about the first axis. The first memory tilt position in this example is a park position, as shown in FIGS. 2A, 3A, 5. The park position in this example may be a substantially upright position that ensures the space between the steering column 30 and the operator seat 22 is sufficient for the operator to leave the seat. The first memory tilt position is non-variable (e.g., independent) relative to the tilt angle θ or the relative position between the intermediate component 50 and the upper component 40. In addition, the locking mechanism 61 is configured for engaging the second positioning portion 52 of the intermediate component 50 when the upper component 40 and the intermediate component 50 are disposed in a second memory tilt position relative to and about the first axis L1, as shown in FIGS. 2B, 3B. The second memory tilt position is an operating position. The second memory tilt position is variable relative to the tilt angle θ. As shown in FIGS. 7A-7D, the relative position between the upper component 40 and the intermediate component 50 is maintained by the first adjustment lock 33 during movement between the first memory tilt position and the second memory tilt position.

In one implementation, the locking mechanism 61 is positioned below the upper component 40 and the intermediate component 50. The locking mechanism 61 may include a latch pin 62. The end portion 622 of the latch pin 62 is insertable into the first positioning portion 42 and the second positioning portion 52. The end portion 622 of the latch pin 62, the first positioning portion 42, and the second positioning portion 52 have appropriate geometry for lock interaction. The end portion 622 of the latch pin 62, in one example, includes a tapered feature. The first positioning portion 42, in one example, may include a recess 422 (or notch, receptacle, through hole, etc.) to receive the end portion 622 of the latch pin 62. When the end portion 622 inserts in the first positioning portion 42, the tapered feature of the end portion 622 engages the recess 422 of the first positioning portion 42 to prevent the rotation of the upper component 40. Likewise, the second positioning portion 52, in one example, may include a receptacle 522 to receive the end portion 622 of the latch pin 62. When the end portion 622 inserts in the second positioning portion 52, the tapered feature of the end portion 622 engages the receptacle 522 of the second positioning portion 52 to prevent the rotation of the upper component 40. It is noted that the end portion 622 of the latch pin 62, the first positioning portion 42, and the second positioning portion 52 shown in FIGS. 2A-5 are merely examples. In another example, the end portion 622 may be a frustoconical shape, and the first positioning portion 42 and the second positioning portion 52 have features corresponding to the end portion 622.

Referring to FIGS. 2A-3C, the locking mechanism 61 may have other elements to facilitate the engagement of the first positioning portion 42 and the second positioning portion 52 with the latch pin 62. The locking mechanism 61 may include a spring 63 configured to bias the latch pin 62 into one of the first positioning portion 42 and the second positioning portion 52 when one of the first positioning portion 42 and the second positioning portion 52 is rotated with the upper component 40 into alignment with the latch pin 62. The locking mechanism 61 may include an actuator 64, which, for example, includes a foot pedal 642, coupled to the latch pin 62 and configured to retract the latch pin 62 against the spring 63 and out of engagement with the first positioning portion 42 or the second positioning portion 52 to release the rotation of the upper component 40 and the intermediate component 50. In other words, once the relative position (e.g., first setting and the second setting) between the upper component 40 and the intermediate component 50 is maintained by first adjustment lock 33, the operator can press the actuator 64 (e.g., foot pedal 642) to release the rotation of the upper component 40 and the intermediate component 50 to move the steering column 30 to the first memory tilt position or the second memory tilt position. When one of the first positioning portion 42 or the second positioning portion 52 is moved to correspond to the latch pin 62, without the operator's operating the actuator 64, the spring 63 (that is compressed) may extend to cause the latch pin 62 engaging one of the first positioning portion 42 or the second positioning portion 52. In another example, the actuator 64 may include a lever or other types of actuator for the operator to retract the latch pin 62 against the spring 63 and out of engagement with the first positioning portion 42 or the second positioning portion 52 to release the rotation of the upper component 40 and the intermediate component 50. It is noted that in the implementation shown in FIGS. 2A-3C, the spring 63 is a compression spring, with coils surrounding a portion of the latch pin 62. In another implementation, the spring 63 is a tension spring (not shown) connected on the support 65 or other component; when the actuator 64 retracts the latch pin 62 against the extension spring, the extension spring extends. When one of the first positioning portion 42 or the second positioning portion 52 is moved to correspond to the latch pin 62, without the operator's operating the actuator 64, the extension spring retracts to pull the latch pin 62 engaging one of the first positioning portion 42 or the second positioning portion 52.

The locking mechanism 61 may also help set the relative position (e.g., first setting and the second setting) between the upper component 40 and the intermediate component 50 before moving the steering column 30 to the first memory tilt position or the second memory tilt position. Three settings are shown in FIGS. 6A-6C. When the first adjustment lock 33 is released and the latch pin 62 is inserted into the second positioning portion 52, the operator may hold the steering wheel 26 (shown in FIG. 1) to pivot the steering column 30 so as to change the tilt angle θ (relative position between the intermediate component 50 and the upper component 40). The tilt angle θ shown in FIG. 6C is greater than the tilt angle θ shown in FIG. 6B, which is greater than the tilt angle shown in FIG. 6A. The upper component 40 may include a first guide edge 44, and the intermediate component 50 may include a second guide edge 54. The tilt angle θ determines an extent of overlap between the first guide edge 44 and second guide edge 54. The overlap between the first guide edge 44 and second guide edge 54 shown in FIG. 6A is greater than the overlap shown in FIG. 6B, which is greater than the overlap shown in FIG. 6C. Once the setting or the tilt angle θ is determined, the operator can move the steering column 30 to the first memory tilt position or the second memory tilt position by pressing the actuator 64. It is noted that in another implementation (not shown) to change the setting or the tilt angle θ, instead of the latch pin 62 inserted into the second positioning portion 52, the latch pin 62 may be inserted into the first positioning portion 42, with the first adjustment lock 33 released, and the operator may hold the steering wheel 26 to pivot the steering column 30 so as to change the tilt angle θ (relative position between the intermediate component 50 and the upper component 40).

Figure 4:
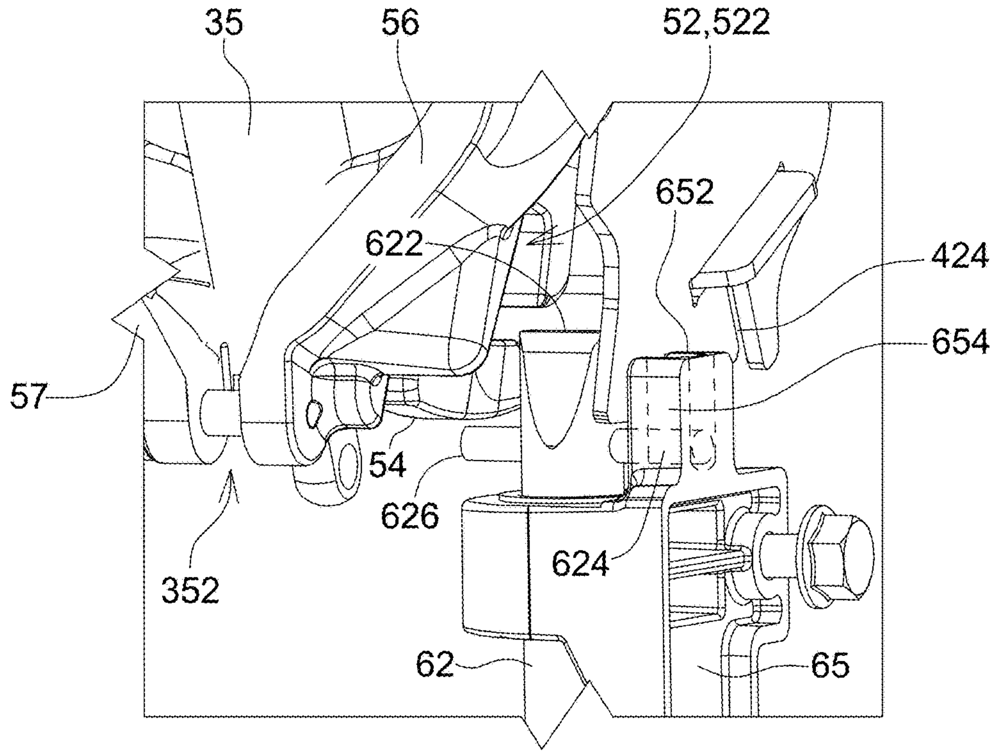
FIG. 4 is an enlarged perspective view of a second adjustment lock, where a latch pin is retracted to allow the rotation of the upper and intermediate components.

Referring to FIG. 4, optionally, the latch pin 62 may include a first cross pin 624 and a second cross pin 626 proximate to the end portion 622 of the latch pin 62. The first cross pin 624 and the second cross pin 626 may facilitate the transition between the first memory tilt position and the second memory tilt position. The locking mechanism 61 includes a support 65 surrounding the latch pin 62. An upper edge 652 of the support 65 forms a slot 654 configured to guide the first cross pin 624 while moving toward a lower end of the slot 654 when the latch pin 62 is retracted for the rotation of the upper component 40 and the intermediate component 50. The interaction between the first cross pin 624 and the slot 654 prevents the rotation or twist of the latch pin 62. In another implementation, the support 65 may have another slot (not shown) to guide the second cross pin 626.

Figure 7A:
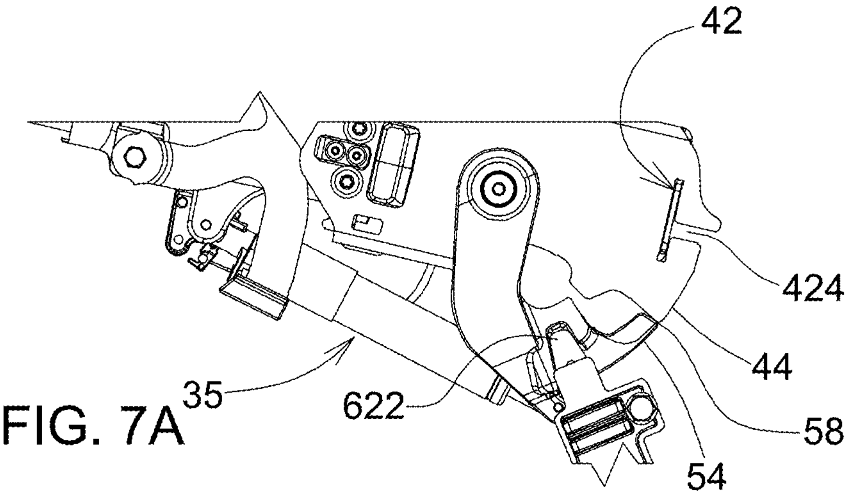
FIGS. 7A-7D illustrate movement between the first memory tilt position and the second memory tilt position with a tilt angle.
Figure 7B:
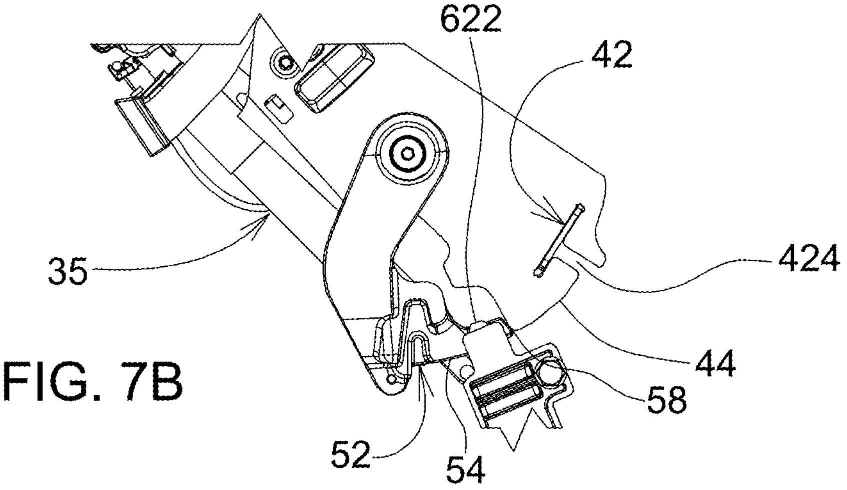
Figure 7C:
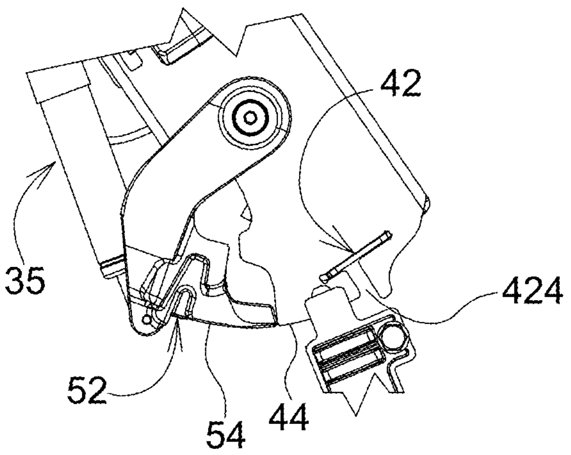
Figure 7D:
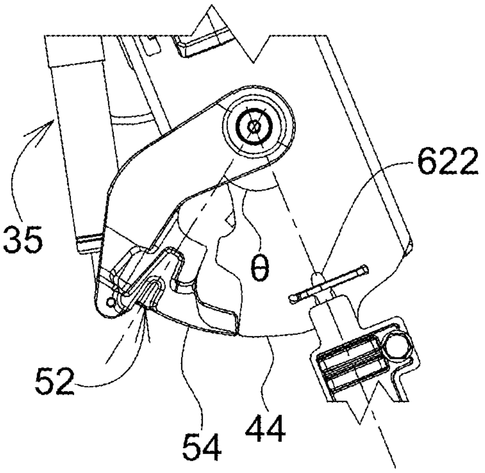

Referring to FIGS. 4, 7A-7D, 8A-8C, the first cross pin 624 is configured to slide along the first guide edge 44, and the second cross pin 626 is configured to slide along the second guide edge 54, when the upper component 40 and the intermediate component 50 pivot about the first axis L1 for changing engagement of the latch pin 62 between the first positioning portion and the second positioning portion to the other. When reviewing the change from FIG. 7A to FIG. 7D, the upper component 40 and the intermediate component 50 rotate clockwise; when reviewing the changes from FIG. 7D to FIG. 7A, the upper component 40 and the intermediate component 50 rotate counterclockwise. FIGS. 7A-7D show when the tilt angle reaches a maximum value. There is no overlap between the first guide edge 44 and second guide edge 54. The gap 58, in a radial direction, between the first guide edge 44 and the second guide edge 54 is less than the diameter of the first cross pin 624 and the diameter of the second cross pin 626. Referring to FIG. 7A to FIG. 7D, when the upper component 40 pivots about the first axis L1 for moving the first positioning portion 42 toward the latch pin 62, and the first guide edge 44 does not fully overlap the second guide edge 54 (here, no overlap), the second cross pin 626 slides along the second guide edge 54 without the first cross pin 624 sliding along the first guide edge 44, and then the first cross pin 624 slides along the first guide edge 44 to the first positioning portion 42 without the second cross pin 626 sliding along the second guide edge 54. Referring to FIG. 7D to FIG. 7A, when the upper component 40 pivots about the first axis L1 for moving the second positioning portion 52 of the intermediate component toward the latch pin 62, and the first guide edge 44 does not fully overlap (here, no overlap) the second guide edge 54, the first cross pin 624 slides along the first guide edge 44 without the second cross pin 626 sliding along the second guide edge 54, and then the second cross pin 626 slides along the second guide edge 54 to the second positioning portion 52 without the first cross pin 624 sliding along the first guide edge 44.

When the operator presses the actuator 64 (e.g., foot pedal 642), the latch pin 62 does not engage the first positioning portion 42 or the second positioning portion, and with the first cross pin 624 and/or the second cross pin 626 sliding along the first guide edge 44 and/or the second guide edge 54, the operator can release the actuator 64 during movement between the first memory tilt position and the second memory tilt position. However, in another implementation, the operator can still press the actuator 64 during movement between the first memory tilt position and the second memory tilt position, and the first cross pin 624 and/or the second cross pin 626 do not contact the first positioning portion 42 and/or the second positioning portion 52 because the retract of the latch pin 62.

Figure 8A:
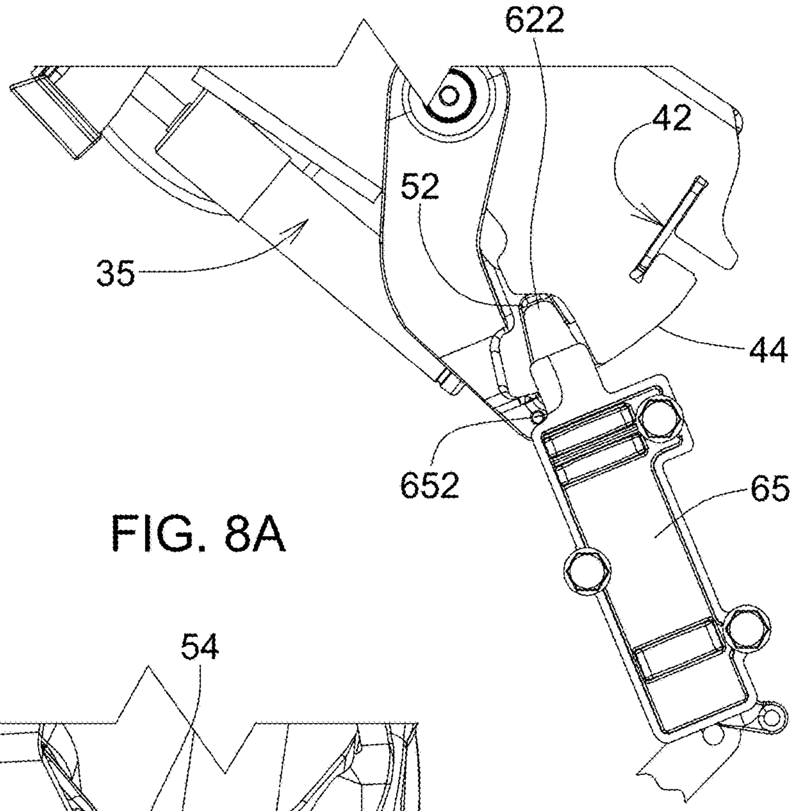
FIGS. 8A-8C illustrate movement between the first memory tilt position and the second memory tilt position with another tilt angle.
Figure 8B:
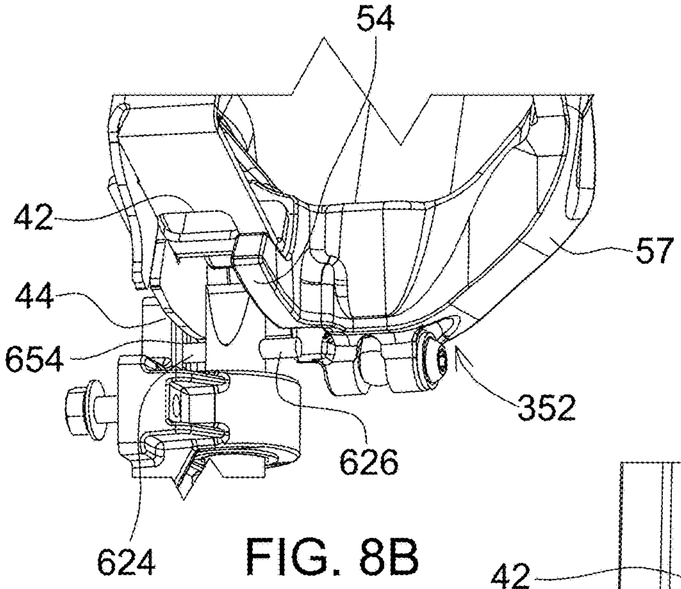
Figure 8C:
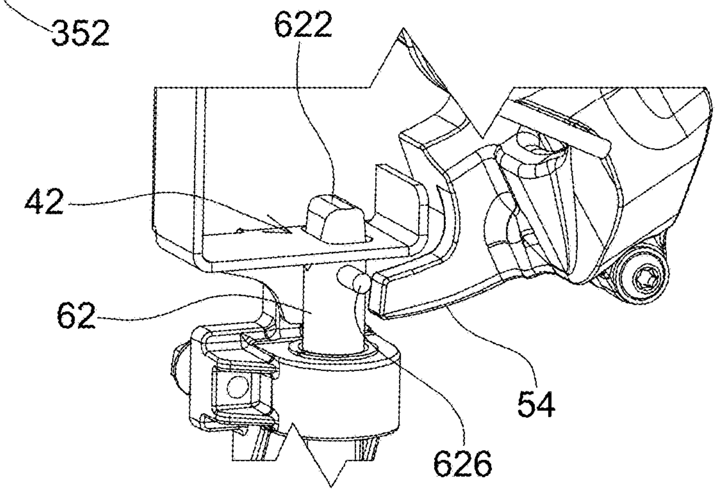

FIGS. 8A-8C present three different views to provide a clear understanding. FIGS. 8A-8C illustrates the tilt angle θ (relative position between the intermediate component 50 and the upper component 40) different from the tilt angle θ shown in FIGS. 7A-7D. There is more overlap between the first guide edge 44 and the second guide edge 54 in FIGS. 8A-8C than in FIGS. 7A-7D. FIG. 8A shows the end portion 622 of the latch pin 62 disposed in the second positioning portion 52, FIG. 8B shows both the first cross pin 624 and the second cross pin 626 disposed below the first guide edge

44 latch pin 62 at the same time during the movement, and FIG. 8C shows the end portion 622 of the latch pin 62 disposed in the first positioning portion 42.

Optionally, the first position portion 42 and/or the second positioning portion 52 may be assisted with additional features to ensure smooth engagement between the latch pin 62 and first position portion 42 and/or the second positioning portion 52. For example, as shown in FIGS. 4, 5. the first guide edge 44 adjacent to the first positioning portion forms a first slot 424 configured to guide the first cross pin 624 while moving toward an upper end of the first slot 424 with the end portion 622 of the latch pin 62 inserting into the recess 422.

Without in any way limiting the scope, interpretation, or application of the claims appearing below, a technical effect of one or more of the example embodiments disclosed herein is once a desired setting (tilt angle/relative position between an upper component and an intermediate component) of the steering column is determined, the operator can rotate the steering column to switch the positions of the steering column between a first memory tilt position and a second memory tilt position. Another technical effect of one or more of the example embodiments disclosed herein is when the first memory tilt position is a park position, different settings of the steering column still result in substantially the same and sufficient space between the steering column and the operator seat for the operator to leave the seat. Another technical effect of one or more of the example embodiments disclosed herein is that after briefly pressing the actuator to disengage one of the first memory tilt position or the second memory tilt position, the operator can rotate the steering column such that the cross pin(s) can engage at least one of the first guide edge 44 and second guide edge 54 during the rotation without keep pressing the actuator.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A steering column for a vehicle, the steering column comprising:

an upper component pivotable about a first axis and including a first positioning portion, wherein the upper component is configured for supporting a steering shaft configured for steering the vehicle;

an intermediate component pivotable relative to the upper component about the first axis and including a second positioning portion;

an adjustable linkage interconnecting the upper component and the intermediate component;

a first adjustment lock configured to secure a relative position between the intermediate component and the upper component to maintain a tilt angle about the first axis defined between the first positioning portion and the second positioning portion; and a second adjustment lock having a locking mechanism configured for engaging the first positioning portion of the upper component when the upper component and the intermediate component are disposed in a first memory tilt position relative to and about the first axis, and wherein the locking mechanism is configured for engaging the second positioning portion of the intermediate component when the upper component and the intermediate component are disposed in a second memory tilt position relative to and about the first axis, whereby the relative position between the upper component and the intermediate component is maintained by the first adjustment lock during movement between the first memory tilt position and the second memory tilt position.

2. The steering column of claim 1, wherein the second memory tilt position is variable relative to the tilt angle, and wherein the first memory tilt position is non-variable relative to the tilt angle.

3. The steering column of claim 1, wherein the locking mechanism is positioned adjacent to the upper component and the intermediate component and includes a latch pin, wherein an end portion of the latch pin is insertable into the first positioning portion and the second positioning portion.

4. The steering column of claim 3, wherein the locking mechanism includes a spring configured to bias the latch pin into one of the first positioning portion and the second positioning portion when one of the first positioning portion and the second positioning portion is rotated with the upper component into alignment with the latch pin.

5. The steering column of claim 4, wherein the locking mechanism includes an actuator coupled to the latch pin and configured to retract the latch pin against the spring and out of engagement with the first positioning portion or the second positioning portion to release the rotation of the upper component and the intermediate component.

6. The steering column of claim 3, wherein the upper component includes a first guide edge, the intermediate component includes a second guide edge, and the tilt angle determines an extent of overlap between the first guide edge and second guide edge.

7. The steering column of claim 6, wherein the latch pin includes a first cross pin and a second cross pin proximate to the end portion of the latch pin, wherein when the upper component and the intermediate component pivot about the first axis for changing engagement of the latch pin between the first positioning portion and the second positioning portion, the first cross pin is configured to slide along the first guide edge, and the second cross pin is configured to slide along the second guide edge.

8. The steering column of claim 7, wherein when the upper component pivots about the first axis for moving the first positioning portion toward the latch pin, and wherein when the first guide edge does not fully overlap the second guide edge, the first cross pin slides along the first guide edge without the second cross pin sliding along the second guide edge.

9. The steering column of claim 7, wherein when the upper component pivots about the first axis for moving the second positioning portion of the intermediate component toward the latch pin, and wherein when the first guide edge does not fully overlap the second guide edge, the second cross pin slides along the second guide edge without the first cross pin sliding along the first guide edge.

10. The steering column of claim 7, wherein the first positioning portion includes a recess to receive the end portion of the latch pin and the first guide edge adjacent to the first positioning portion forms a first slot configured to guide the first cross pin while moving toward an upper end of the first slot with the end portion of the latch pin inserting into the recess.

11. The steering column of claim 7, wherein the locking mechanism includes a support surrounding the latch pin, wherein an upper edge of the support forms a slot configured to guide one of the first cross pin or second cross pin while moving toward a lower end of the slot when the latch pin is retracted.

12. The steering column of claim 7, wherein when the tilt angle reaches a maximum value, a gap, in a radial direction, between the first guide edge and the second guide edge is less than a diameter of the first cross pin and a diameter of the second cross pin.

13. The steering column of claim 3, wherein the end portion of the latch pin includes a tapered feature, and when the end portion inserts in the first positioning portion, the tapered feature engages a recess of the first positioning portion to prevent the rotation of the upper component.

14. The steering column of claim 3, wherein the first memory tilt position is a park position, and the second memory tilt position is an operating position.

15. The steering column of claim 1, further comprising a first hinge interconnecting the upper component and the intermediate component.

16. The steering column of claim 15, further comprising a second hinge interconnecting the adjustable linkage and the intermediate component.

17. The steering column of claim 16, wherein the adjustable linkage includes one of a strut, a turn buckle, and an electric actuator.

18. The steering column of claim 16, wherein the intermediate component includes a first arm and a second arm, upper ends of which are pivotably coupled to the first hinge with the upper component disposed therebetween, and the first arm and the second arm extend downward and are coupled to the adjustable linkage via the second hinge.

19. The steering column of claim 18, further comprising a third hinge interconnecting the adjustable linkage and the upper component.

* * * * *